US010628529B2

(12) United States Patent
Zhelezniak et al.

(10) Patent No.: US 10,628,529 B2
(45) Date of Patent: Apr. 21, 2020

(54) DEVICE AND METHOD FOR NATURAL LANGUAGE PROCESSING

(71) Applicant: Babylon Partners Limited, London (GB)

(72) Inventors: Vitalii Zhelezniak, London (GB); Alexsandar Savkov, London (GB); Francesco Moramarco, London (GB); Jack Flann, London (GB); Nils Hammerla, London (GB)

(73) Assignee: Babylon Partners Limited, London (GB)

( * ) Notice: Subject to any disclaimer, the term of this patent is extended or adjusted under 35 U.S.C. 154(b) by 0 days.

(21) Appl. No.: 16/283,707

(22) Filed: Feb. 22, 2019

(65) Prior Publication Data

US 2019/0354588 A1 Nov. 21, 2019

(30) Foreign Application Priority Data

May 17, 2018 (GB) .................................. 1808056.4

(51) Int. Cl.
  *G06F 17/27* (2006.01)
(52) U.S. Cl.
  CPC ................................ *G06F 17/2785* (2013.01)
(58) Field of Classification Search
  None
  See application file for complete search history.

(56) References Cited

U.S. PATENT DOCUMENTS 6,845,354 B1 * 1/2005 Kuo ...................... G06F 17/277
 704/9
8,311,973 B1 * 11/2012 Zadeh ...................... G06N 7/02
 706/62

(Continued)

FOREIGN PATENT DOCUMENTS

CN 107632978 A 1/2018
CN 107977358 A 5/2018
(Continued)

OTHER PUBLICATIONS

Vitalii Zhelezniak, Dan Busbridge, April Shen, Samuel L. Smith, and Nils Y. Hammerla. 2018. Decoding decoders: Finding optimal representation spaces for unsupervised similarity tasks. https://openreview.net/forum?id=Byd-EfWCb.

(Continued)

*Primary Examiner* — Douglas Godbold
(74) *Attorney, Agent, or Firm* — McDermott Will & Emery LLP

(57) ABSTRACT

Methods for determining whether two sets of words are similar are provided. In one aspect, a method includes receiving a first set of words and a second set of words, which are subsets of a vocabulary, and each of the first and second sets of words include word embeddings corresponding to each word. The method also includes determining a word membership function for each word in the vocabulary. Determining the word membership includes determining a set of similarity values, each representing the similarity between the word and a respective word in the vocabulary. The method also includes determining a membership function for the first and second sets of words based on the determined word membership functions, and determining a set-based coefficient for the similarity between the first and (Continued)

second sets of words based on the membership function. Systems and devices are also provided.

14 Claims, 7 Drawing Sheets

(56) References Cited

U.S. PATENT DOCUMENTS

| | | | |
|---|---|---|---|
| 2011/0238410 A1* | 9/2011 | Larcheveque | G06F 17/2785 704/9 |
| 2012/0150835 A1* | 6/2012 | Bobick | G06F 17/2795 707/706 |
| 2016/0328383 A1 | 11/2016 | Cross, III et al. | |
| 2016/0329044 A1 | 11/2016 | Cao et al. | |
| 2016/0358094 A1 | 12/2016 | Fan | |
| 2016/0364377 A1* | 12/2016 | Krishnamurthy | G06F 17/271 |
| 2017/0116173 A1* | 4/2017 | Lev-Tov | H04M 3/4936 |
| 2017/0293725 A1 | 10/2017 | Liu | |
| 2018/0053107 A1* | 2/2018 | Wang | G06F 17/2785 |

FOREIGN PATENT DOCUMENTS

| | | |
|---|---|---|
| EP | 3229157 A1 | 10/2017 |
| JP | 2012014476 A | 5/2012 |

OTHER PUBLICATIONS

Guoqing Zheng and Jamie Callan. 2015. Learning to reweight terms with distributed representations. In Proceedings of the 38th International ACM SIGIR Conference on Research and Development in Information Retrieval. ACM, New York, NY, USA, SIGIR '15, pp. 575-584. https://doi.org/10.1145/2766462.2767700.

Eneko Agirre. 2015. SemEval-2015 Task 2: Semantic Textual Similarity, English, Spanish and Pilot on Interpretability. SemEval2015 (SemEval):252-263.

Eneko Agirre, Carmen Banea, Claire Cardie, Daniel Cer, Mona Diab, Aitor Gonzalez-Agirre, Weiwei Guo, Rada Mihalcea, German Rigau, and Janyce Wiebe. 2014. SemEval-2014 Task 10: Multilingual Semantic Textual Similarity. Proc. 8th Int. Work. Semant. Eval. (SemEval 2014) (SemEval):81-91.

Eneko Agirre, Carmen Banea, Daniel Cer, Mona Diab, Aitor Gonzalez-Agirre, Rada Mihalcea, German Rigau, and Janyce Wiebe. 2016. SemEval-2016 Task 1: Semantic Textual Similarity, Monolingual and Cross-Lingual Evaluation. Proc. 10th Int. Work. Semant. Eval. pp. 497-511. http://aclweb.org/anthology/S16-1081.

Eneko Agirre, Daniel Cer, Mona Diab, and Aitor Gonzalez-Agirre. 2012. SemEval-2012 Task 6: A Pilot on Semantic Textual Similarity. Proc. 6th Int. Work. Semant. Eval. (SemEval 2012), conjunction with First Jt. Conf. Lex. Comput. Semant. (* SEM 2012) (3):385-393.

Eneko Agirre, Daniel Cer, Mona Diab, Aitor Gonzalez-Agirre, and Weiwei Guo. 2013. SEM 2013 shared task : Semantic Textual Similarity. Second Jt. Conf. Lex. Comput. Semant. (*SEM 2013) 1:32-43.

Sanjeev Arora, Yingyu Liang, and Tengyu Ma. 2017. A Simple but Tough-to-Beat Baseline for Sentence Embeddings. Int. Conf. Learn. Represent. pp. 1-14.

B. De Baets and H. De Meyer. 2005. Transitivity preserving fuzzification schemes for cardinalitybased similarity measures. European Journal of Operational Research 160(3):726-740. https://doi.org/10.1016/j.ejor.2003.06.036.

Marco Baroni, Georgiana Dinu, and Germ'an Kruszewski. 2014. Don't count, predict! A systematic comparison of context-counting vs. context-predicting semantic vectors. In Proc. 52nd Annu. Meet. Assoc. Comput. Linguist. (vol. 1 Long Pap . . . Association for Computational Linguistics, Stroudsburg, PA, USA, pp. 238-247. http://aclweb.org/anthology/P14-1023.

William Blacoe and Mirella Lapata. 2012. A comparison of vector-based representations forsemantic composition. In Proceedings of the 2012 Joint Conference on Empirical Methods in Natural Language Processing and Computational Natural Language Learning. Association for Computational Linguistics, Stroudsburg, PA, USA, EMNLP-CoNLL '12, pp. 546-556. http://dl.acm.org/citation.cfm?id=2390948.2391011.

Piotr Bojanowski, Edouard Grave, Armand Joulin, and Tomas Mikolov. 2016. Enriching Word Vectors with Subword Information http://arxiv.org/abs/1607.04606.

Daniel Cer, Mona Diab, Eneko Agirre, I~nigo Lopez-Gazpio, and Lucia Specia. 2017. SemEval-2017 Task 1: Semantic Textual Similarity—Multilingual and Cross-lingual Focused Evaluation. Proc. 11th Int. Work. Semant. Eval. pp. 1-14.

Alexis Conneau, Douwe Kiela, Holger Schwenk, Loic Barrault, and Antoine Bordes. 2017. Supervised Learning of Universal Sentence Representations from Natural Language Inference Data http://arxiv.org/abs/1705.02364.

Lee R. Dice. 1945. Measures of the amount of ecologic association between species. Ecology 26(3):297-302. https://doi.org/10.2307/1932409.

Felix A. Gers, Nicol N. Schraudolph, and J¨urgen Schmidhuber. 2003. Learning precise timing with lstm recurrent networks. J. Mach. Learn. Res. 3:115-143.

Zellig Harris. 1954. Distributional structure. Word 10(23):146-162.

Felix Hill, Kyunghyun Cho, and Anna Korhonen. 2016. Learning Distributed Representations of Sentences from Unlabelled Data http://arxiv.org/abs/1602.03483.

Mohit Iyyer, Varun Manjunatha, Jordan Boyd-Graber, and Hal Daum'e III. 2015. Deep unordered composition rivals syntactic methods for text classification. In Association for Computational Linguistics.

Sung-Hyuk Cha. 2007. Comprehensive Survey on Distance/Similarity Measures between Probability Density Functions. International Journal of Mathematical Models and Methods in Applied Sciences—Issue 4, vol. 1 pp. 300-307.

Sergio Jimenez, Claudia Becerra, and Alexander Gelbukh. 2012. Soft cardinality: A parameterized similarity function for text comparison. In Proceedings of the First Joint Conference on Lexical and Computational Semantics—vol. 1: Proceedings of the Main Conference and the Shared Task, and vol. 2: Proceedings of the Sixth International Workshop on Semantic Evaluation. Association for Computational Linguistics, Stroudsburg, PA, USA, SemEval '12, pp. 449-453. http://dl.acm.org/citation.cfm?id=2387636.2387709.

Sergio Jimenez, Claudia Jeanneth Becerra, and Alexander F. Gelbukh. 2013. Softcardinality-core: Improving text overlap with distributional measures for semantic textual similarity. In *SEM@NAACL-HLT.

Sergio Jimenez, George Due~nas, Julia Baquero, and Alexander F. Gelbukh. 2014. Unal-nlp: Combining soft cardinality features for semantic textual similarity, relatedness and entailment. In SemEval@COLING.

Sergio Jimenez, Fabio Gonzalez, and Alexander Gelbukh. 2010. Text comparison using soft cardinality. In Edgar Chavez and Stefano Lonardi, editors, String Processing and Information Retrieval. Springer Berlin Heidelberg, Berlin, Heidelberg, pp. 297-302.

Sergio Jimenez, Fabio A. Gonzalez, and Alexander Gelbukh. 2015. Soft cardinality in semantic text processing: Experience of the SemEval international competitions. Polibits 51:63-72. https://doi.org/10.17562/pb-51-9.

Armand Joulin, Edouard Grave, Piotr Bojanowski, and Tomas Mikolov. 2017. Bag of Tricks for Efficient Text Classification. In Proc. 15th Conf. Eur. Chapter Assoc. Comput. Linguist. vol. 2, Short Pap . . . Association for Computational Linguistics, Stroudsburg, PA, USA, pp. 427-431. http://arxiv.org/abs/1607.01759.

Nal Kalchbrenner, Edward Grefenstette, and Phil Blunsom. 2014. A Convolutional Neural Network for Modelling Sentences. In Proc. 52nd Annu. Meet. Assoc. Comput. Linguist. (vol. 1 Long Pap. Association for Computational Linguistics, Stroudsburg, PA, USA, pp. 655-665. http://arxiv.org/abs/1404.2188.

Ryan Kiros, Yukun Zhu, Ruslan Salakhutdinov, Richard S. Zemel, Antonio Torralba, Raquel Urtasun, and Sanja Fidler. 2015. Skip-Thought Vectors http://arxiv.org/abs/1506.06726.

Matt J. Kusner, Yu Sun, Nicholas I. Kolkin, and Kilian Q. Weinberger. 2015. From word embeddings to document distances. In Proceed-

(56) References Cited

OTHER PUBLICATIONS ings of the 32Nd International Conference on International Conference on Machine Learning. JMLR.org, vol. 37 of ICML'15, pp. 957-966.
Saar Kuzi, Anna Shtok, and Oren Kurland. 2016. Query expansion using word embeddings. In Proceedings of the 25th ACM International on Conference on Information and Knowledge Management. ACM, New York, NY, USA, CIKM '16, pp. 1929-1932.
Omer Levy and Yoav Goldberg. 2014. Neural Word Embedding as Implicit Matrix Factorization. In Z Ghahramani, MWelling, C Cortes, N D Lawrence, and K Q Weinberger, editors, Adv. Neural Inf. Process. Syst. 27, Curran Associates, Inc., pp. 2177-2185.
Andrew L. Maas, Raymond E. Daly, Peter T. Pham, Dan Huang, Andrew Y. Ng, and Christopher Potts. 2011. Learning word vectors for sentiment analysis. In Proceedings of the 49th Annual Meeting of the Association for Computational Linguistics: Human Language Technologies—vol. 1. Association for Computational Linguistics, Stroudsburg, PA, USA, HLT '11, pp. 142-150.
Tomas Mikolov, Kai Chen, Greg Corrado, and Jeffrey Dean. 2013. Efficient Estimation of Word Representations in Vector Space pp. 1-12. http://arxiv.org/abs/1301.3781.
Jeff Mitchell and Mirella Lapata. 2008. Vector-based models of semantic composition. In in Proceedings of ACL-08: HLT. pp. 236-244.
Jeff Mitchell and Mirella Lapata. 2010. Composition in Distributional Models of Semantics. Cogn. Sci. 34(8):1388-1429.
A.Ochiai. 1957. Zoogeographic studies on the solenoid fishes found in japan and its neighbouring regions. Bull Jpn Soc Fish Sci. 22(9):526-530.
Jeffrey Pennington, Richard Socher, and Christopher Manning. 2014. Glove: Global Vectors for Word Representation. In Proc. 2014 Conf. Empir. Methods Nat. Lang. Process . . . Association for Computational Linguistics, Stroudsburg, PA, USA, pp. 1532-1543.
Seyed Mandi Rezaeinia, Ali Ghodsi, and Rouhollah Rahmani. 2017. Improving the accuracy of pre-trained word embeddings for sentiment analysis. CoRR abs/1711.08609. http://arxiv.org/abs/1711.08609.
Gerald Salton, A. Wong, and C. S. Yang. 1975. A vector space model for automatic indexing. Commun. ACM 18(11):613-620.
Richard Socher, Christopher Manning, Brody Huval, and Andrew Ng. 2012. Semantic compositionality through recursive matrix-vector spaces. In EMNLP-CoNLL '12 Proc. 2012 Jt. Conf. Empir. Methods Nat. Lang. Process. Comput. Nat. Lang. Learn. pp. 1201-1211. https://doi.org/10.1162/153244303322533223.
Richard Socher, Alex Perelygin, Jean Y. Wu, Jason Chuang, Christopher D. Manning, Andrew Y. Ng, and Christopher Potts. 2013. Recursive deep models for semantic compositionality over a sentiment treebank. In in Proceedings of EMNLP. pp. 1631-1642.
T. Sørensen. 1948. A method of establishing groups of equal amplitude in plant sociology based on similarity of species and its application to analyses of the vegetation on Danish commons. Biol. Skr. 5:1-34.
Kai Sheng Tai, Richard Socher, and Christopher D Manning. 2015. Improved Semantic Representations From Tree-Structured Long Short-Term Memory Networks.
David J.Weir, JulieWeeds, Jeremy Reffin, and Thomas Kober. 2016. Aligning packed dependency trees: A theory of composition for distributional semantics. Computational Linguistics 42(4):727-761.
John Wieting, Mohit Bansal, Kevin Gimpel, and Karen Livescu. 2015. Towards Universal Paraphrastic Sentence Embeddings pp. 1-17. http://arxiv.org/abs/1511.08198.
John Wieting and Kevin Gimpel. 2017. Revisiting Recurrent Networks for Paraphrastic Sentence Embeddings. In Proc. 55th Annu. Meet. Assoc. Comput. Linguist. (vol. 1 Long Pap . . . Association for Computational Linguistics, Stroudsburg, PA, USA, pp. 2078-2088. http://arxiv.org/abs/1705.00364 http://aclweb.org/anthology/P17-1190.
Liang-Chih Yu, Jin Wang, K. Robert Lai, and Xuejie Zhang. 2017. Refining word embeddings for sentiment analysis. In Proceedings of the 2017 Conference on Empirical Methods in Natural Language Processing. Association for Computational Linguistics, pp. 534-539.
Zadeh, L. A. (1965). "Fuzzy sets". Information and Control. 8 (3): 338-353.
Hamed Zamani and W. Bruce Croft. 2016. Estimating embedding vectors for queries. In Proceedings of the 2016 ACM International Conference on the Theory of Information Retrieval. ACM, New York, NY, USA, ICTIR '16, pp. 123-132.
Hamed Zamani and W. Bruce Croft. 2017. Relevance based word embedding. In Proceedings of the 40th International ACM SIGIR Conference on Research and Development in Information Retrieval. ACM, New York, NY, USA, SIGIR 17, pp. 505-514. https://doi.org/10.1145/3077136.3080831.
Han Zhao, Zhengdong Lu, and Pascal Poupart. 2015. Self-adaptive hierarchical sentence model. In Proceedings of the 24th International Conference on Artificial Intelligence. AAAI Press, IJCAI'15, pp. 4069-4076. http://dl.acm.org/citation.cfm?id=2832747.2832816.
Rui Zhao and Kezhi Mao. 2017. Fuzzy bagof-words model for document representation. IEEE Transactions on Fuzzy Systems pp. 1-1. https://doi.org/10.1109/tfuzz.2017.2690222.

* cited by examiner

DEVICE AND METHOD FOR NATURAL LANGUAGE PROCESSING

CROSS-REFERENCE TO RELATED APPLICATION

This application claims the benefit of priority to Great Britain Patent Application Number 1808056.4, filed on May 17, 2018, which is incorporated herein by reference.

TECHNICAL FIELD

The present disclosure relates to natural language processing. In particular, but without limitation, this disclosure relates to methods and devices for determining whether two sets of words are similar.

BACKGROUND

Natural language processing and chatbots are now becoming commonplace in many fields; however, such systems are not perfect. The ramifications of giving an incorrect answer by a chatbot to a question relating to directions or re-directing a call in an automated computer system are annoying, but unlikely to cause serious distress.

There is a much larger challenge to implement a chatbot in a medical setting as incorrect advice could potentially have disastrous results. For this reason, chatbots that are deployed to give medical information are strictly controlled to give advice that is validated by a medical professional. Having said this, a user of a medical chatbot may express their symptoms in many different ways and the validation by a medical professional must be able to cover all inputs. Also, validation by a medical expert is a long process and repetition of the validation process should be minimised.

There is therefore a need for improve natural language processing, particularly in the field of chatbots for providing medical information.

SUMMARY

According to a first aspect there is provided a computer-implemented method for determining similarity between a first set of words and a second set of words, the method comprising: receiving the first set of words and the second set of words, wherein the first and second sets of words are subsets of a vocabulary and each of the first and second sets of words comprise word embeddings corresponding to each word; determining a word membership function for each word in the first and second sets of words, wherein determining a word membership function for a word comprises determining a set of similarity values, each similarity value representing the similarity between the word and a respective word in the vocabulary; determining a membership functiPage on for the first set of words and a membership function for the second set of words based on the determined word membership functions; and determining a set-based coefficient for the similarity between the first and second sets of words based on the membership function for the first set of words and the membership function for the second set of words.

The methods and systems described herein combine set-based similarity with fuzzy set theory to provide a more effective mechanism for determining the similarity between two sets of words. Each set of word may be a phrase or sentence. By providing a more effective method of determining the similarity between sentences, the embodiments described herein provide improvements in natural language processing that can be applied in various fields, including the generation of artificial conversation.

Receiving the first and second sets of words may comprise receiving an indication of the words in each set and determining corresponding word embeddings for each word. Each word embedding may describe the corresponding word in form of hidden (embedded) parameters. Each embedding may be determined by multiplying the corresponding word vector with an embedding matrix.

An indication of the words in each set may comprise a word vector for each word in the set. The first and second sets of words may be first and second phrases and/or first and second sentences.

Determining a word membership function for each word in the first and second sets of words may comprise determining a corresponding similarity between each word in each set of words and each word in the vocabulary. Each word membership function may comprise a set of similarity values including a corresponding similarity value for each word in the vocabulary.

Advantageously, determining a membership function for the first set of words and a membership function for the second set of words may comprise, for each set of words, determining a fuzzy union between the word membership functions for the respective set of words.

Advantageously, the fuzzy union between the word membership functions for the respective set of words may comprise determining the triangular conorm between the word membership functions for the respective set of words.

Advantageously, the triangular conorm may be the maximum triangular conorm and determining the fuzzy union between the word membership functions for the respective set of words may comprise determining, for each word in the vocabulary, the maximum similarity value taken from the similarity values for the word relative to each word in the set of words.

Advantageously, determining the set-based coefficient may comprise determining the intersection between the first set of words and the second set of words.

Advantageously, the set-based coefficient may comprise one of a Jaccard similarity coefficient, a cosine similarity coefficient, a Sørensen-Dice similarity index and an overlap coefficient.

The cosine similarity coefficient may also be known as an Ochiai coefficient

Advantageously, determining the set-based coefficient may comprise: for each word in the vocabulary, determining a maximum similarity value from the determined similarity values for the first set of words; for each word in the vocabulary, determining a maximum similarity value from the determined similarity values for the second set of words relative to the respective word in the vocabulary; for each word in the vocabulary, determining a highest similarity value taken from the maximum similarity values for the word; for each word in the vocabulary, determining a lowest similarity taken from the maximum similarity values for the word; determining an intersection between the first and second sets of words by determining a sum of each of the lowest similarity values; determining a union between the first and second sets of words by determining a sum of each of the highest similarity values; and determining the set-based coefficient by dividing the intersection by the union.

In the above embodiment, the set based coefficient could be the Jaccard index. Determining a maximum similarity value from the determined similarity values for the first set of words may be considered determining a first maximum similarity value for the word and determining a maximum similarity value from the determined similarity values for the second set of words may be considered determining a second maximum similarity value for the word.

Advantageously, the similarity values may be determined based on a dot product membership function or a cosine membership function.

Advantageously, the dot product membership function $\mu_{w_i}$ between two word embeddings W and W may be one of:

$$\mu_{w_i}(w_j) = W_i \cdot W_j$$

or $$\mu_{w_i}(w_j) = \alpha_i \alpha_j W_i \cdot W_j$$

wherein $\alpha_i$ and $\alpha_j$ are weights corresponding to $W_i$ and $W_j$ respectively.

Advantageously, the cosine membership function $\mu_{w_i}$ between two word embeddings $W_i$ and $W_j$ may be:

$$\mu_{w_i}(w_j) = \frac{\cos(W_i, W_j) + 1}{2}$$

Advantageously, the vocabulary may consist of the first set of words and the second set of words. This provides a more efficient method for determining the similarity as other words outside of the first and second set of words need not be considered. This therefore limits the number of similarity values that need to be calculated.

According to a further aspect there is provided a system for determining similarity between a first set of words and a second set of words, the system comprising a processor configured to implement any of the methods described herein.

According to a further aspect there is provided a non-transient computer readable medium comprising instructions that, when executed by a computer, cause the computer to implement any of the methods described herein.

According to a further aspect there is provided a computer implemented method for retrieving content in response to receiving a natural language query, the method comprising: receiving a natural language query submitted by a user using a user interface; generating an embedded sentence from said query; determining a similarity between the embedded sentence derived from the received natural language query and embedded sentences from queries saved in a database using any of the methods described herein; retrieving a response for an embedded sentence determined to be similar to one of the saved queries; and providing the response to the user via the user interface.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
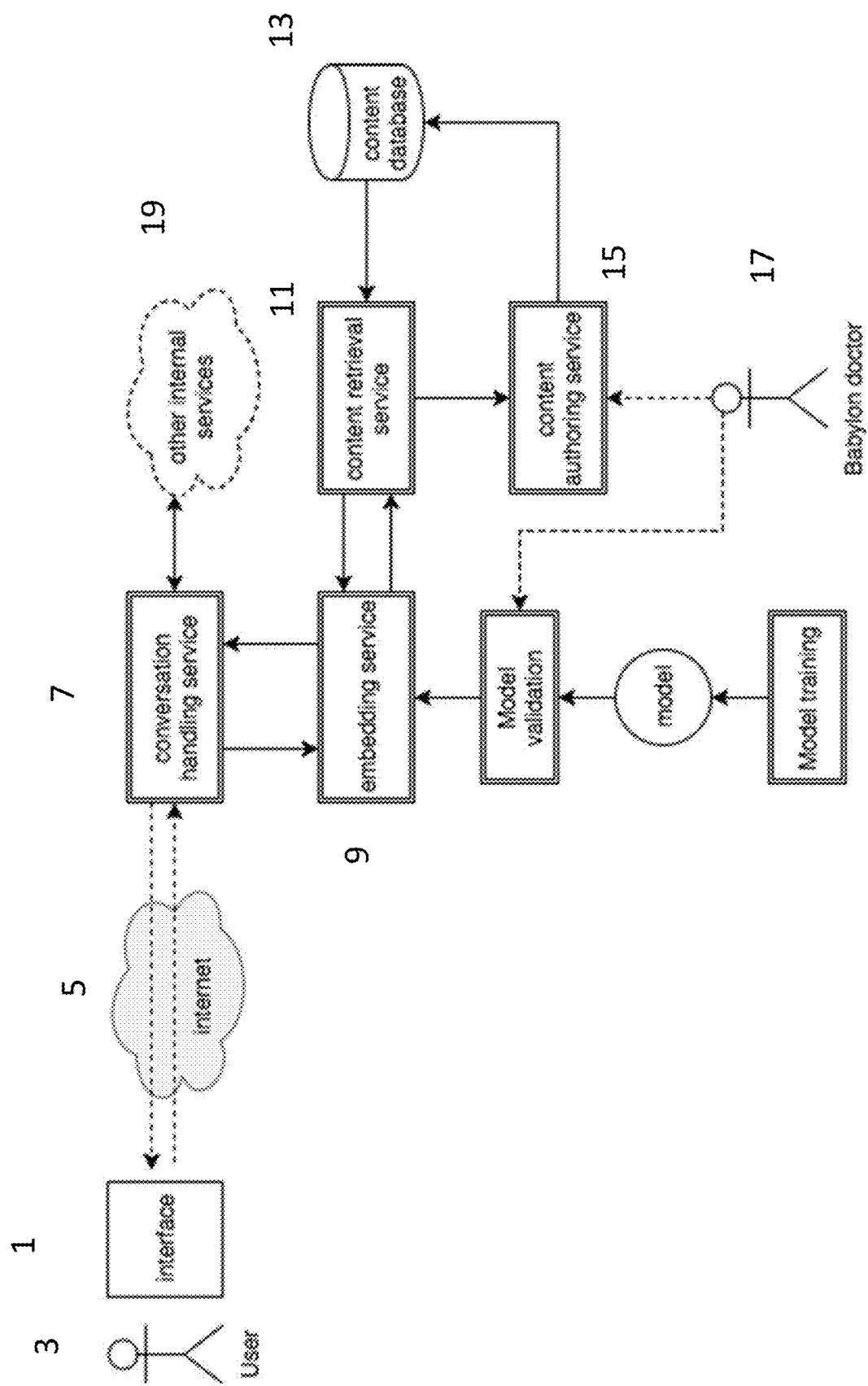
FIG. 1 shows a system in accordance with a first embodiment.

This specification relates to the determination of similarity between sets of words, for instance, the determination of similarity between sentences.

The expressiveness of natural language renders automatic determination of semantic textual similarity a challenging task. Common count-based representations for text such as Bag-of-Words (BoW), which do not incorporate any information about word-to-word similarity, are unsuitable to determine semantic textual similarity for short pieces of text (e.g. sentences).

Embodiments described herein apply a "fuzzy" approach to count-based representations in which embeddings for words are used to construct membership functions for fuzzy versions of BoW methods. The embodiments described herein are applicable to common cardinality-based measures, such as the Jaccard coefficient. Further embodiments provide improvements in computational efficiency and simplicity, yet outperform current baselines with regard to similarity measures by a large margin.

The embodiments described herein may be implemented in computing systems. An example computing system may comprise a processor, memory and an interface. Two sets of words may be input into the system via the interface (for instance, via a keyboard or via a network connection), or may be retrieved from memory. For instance, the sets of words may be input via a keyboard, via speech recognition, via touch screen, etc.

Each word within each set of words may be represented by a vector that uniquely represents that word taken from an overall vocabulary of words. The processor may be configured to determine the similarity between the two sets of words using the methods described herein and output a similarity value representing the similarity between the two sets of words. The similarity value may be output to memory or via the interface (e.g. to a display or to a network).

The methods described herein make use of word embeddings (or embedded vectors) that may be determined from the word vectors (as shall be discussed in more detail). These word embeddings represent the words in terms of hidden parameters representing innate features of the words. The word embeddings may either be input into the system (e.g. the words may be input in the form of embeddings) or determined by the system itself. The embodiments described herein combine the use of word embeddings with set-based coefficients of similarity to provide more accurate quantification of the similarity between sets of words. Furthermore, embodiments described herein provide improvements in computationally efficiency.

Natural languages are able to encode messages with very similar meaning using very different vocabulary and grammatical constructs. This is typically desirable in communication between humans but poses great difficulties in formalising the understanding of human language. Determining the semantic similarity between words or word sequences (phrases, sentences, paragraphs, etc.) is critical for various Natural Language Processing (NLP) tasks, such as information retrieval and document classification.

Semantic similarity naturally depends on how the texts are represented as well as the distance measure between the representations. Semantic similarity can be determined using count-based methods such as Bag-of-Words. These representations are simple and interpretable but remain inflexible as they do not incorporate a sense of similarity between words. The cosine similarity between BoW vectors oftentimes cannot capture semantic relatedness, particularly for short texts, such as sentences.

Distributed representations, such as word embeddings, can be utilised in natural language processing. Distributed representations are able to encode richer notions of semantic similarity in their vectors. In addition to word embeddings, distributed representations of sentences are possible, with methods ranging from simple additive composition of word vectors to complex deep learning architectures.

Astonishingly, the average word vector (AWV) models (with minor enhancements) seem to outperform deep networks on unsupervised similarity tasks. While this observation makes a strong case for the expressive power of AWV, the present disclosure shows that it may not always be the best way to utilise word embeddings for sentence similarity.

Instead, embodiments described herein utilise fuzzy BoW (μ-BoW) representations where the degrees of word membership are derived from the similarities between word embeddings. It is shown that cardinality-based coefficients, such as Jaccard, Ochiai (cosine) and Sørensen-Dice can be applied to compare two sentences represented as μ-BoW.

The above methods are described below. First, a general framework for the fuzzification of count-based methods such as BoW is introduced. Then cardinality based coefficients are used to measure similarity between such representations. These measures are termed the Fuzzy Set Similarity (FUSS).

Second, improved embodiments are introduced that are more computationally efficient and simpler to implement.

The description herein discusses the similarity between sentences. This can be equally applied to any phrases, e.g. any set of words or sets of words.

At the core, the present embodiments seek to improve BoW models by leveraging the power of word embeddings. The Word Mover's Distance (WMD) achieves this via reformulating the distance between BoW vectors as an optimal transport problem with the cost matrix derived from cosine similarities between word embeddings.

Unlike WMD, the embodiments described herein strengthen the BoW model by incorporating fuzziness into an otherwise crisp representation. The methods described herein utilise membership values that are derived from the similarity between the words in the sentences and base terms in the vocabulary. The methods then determine the similarity between the membership functions using various similarity measures.

The Jimenez similarity is a soft cardinality framework to alleviate the crispiness of classical set cardinality. A critical hyperparameter in this method is the choice of the similarity function between the elements (words) in a set. In particular, Jimenez can make use of word embeddings for such a similarity. However, the soft cardinality framework does not consider uncertainty in the membership of a particular element; only uncertainty as to the contribution of an element to the cardinality of the set.

Table 1 shows a number of cardinality based similarity measures that are applicable to the present methodology.

TABLE 1

| Cardinality-based similarity measures | |
|---|---|
| Similarity measure | $sim(S_i, S_j) =$ |
| Jaccard | $\frac{\|S_i \cap S_j\|}{\|S_i \cup S_j\|}$ |

TABLE 1-continued

| Cardinality-based similarity measures | |
|---|---|
| Similarity measure | $sim(S_i, S_j) =$ |
| Cosine | $\frac{\|S_i \cap S_j\|}{\sqrt{\|S_i\| \times \|S_j\|}}$ |
| Sørensen-Dice | $\frac{2\|S_i \cap S_j\|}{\|S_i\| + \|S_j\|}$ |
| Overlap | $\frac{\|S_i \cap S_j\|}{\|\min(\|S_i\|, \|S_j\|)\|}$ |

The embodiments described herein combine the ideas from all the three directions: synergy of BoW and word embeddings, fuzzy set theory, and cardinality-based coefficients to provide an improved framework for determining similarity in natural language processing.

Fuzzy Set Similarity (FUSS)

The embodiments described herein seek to implement a similarity measure that uses cardinality-based coefficients but at the same time leverages the full power of distributed representations. To this end, word vectors are implemented to naturally induce membership functions that can be used to fuzzify expressions such as the similarity measures in Table 1, effectively opening a whole new class of similarity measures for application in determining semantic textual similarity.

BoW and Set-Based Models

The Bag-of-Words (BoW) model of text is simple and interpretable but remains inflexible as the mapping functions are crisp.

Given a vocabulary $V=\{w_1, w_2, \ldots w_N\}$ of N word vectors ($w_N$), a sentence s can be represented by a binary vector $h=\{0,1\}^{|V|}$, where $$h[i] = \begin{cases} 1 & \text{if } w_i \in s \\ 0 & \text{otherwise} \end{cases}$$

That is, each value of h represents one of the words from the vocabulary, and is equal to 1 if that word is present in the sentence, and is equal to 0 if that word is not present in the sentence.

A word vector $w_N$ is a vector representing a word, wherein every element in the vector is associated with a different word in the vocabulary (the vector has a dimension equal to the number of words in the vocabulary). In the BoW model, the encoding of a given word is the vector in which the corresponding element within the vector is set to one and all other elements are zero.

The similarity between two word vectors $w_i$ and $w_j$ can be estimated via their cosine similarity $$sim(s_i, s_j) = \cos(w_i, w_j) = \frac{w_i \cdot w_j}{\|w_i\| \cdot \|w_j\|}$$

Equally, the similarity between two sentences $s_i$ and $s_j$ can be estimated from their respective representations $h_i$ and $h_j$ by $$sim(s_i, s_j) = \cos(h_i, h_j) = \frac{h_i \cdot h_j}{\|h_i\| \cdot \|h_j\|} \qquad (1)$$

That is, the similarity can be determined from the cosine similarity, which in turn can be determined by dividing the dot product of the two vectors by the magnitudes the two vectors multiplied together.

An alternative view of the above similarity can be recovered from set theory. Let each sentence be represented as a set of its constituent words, i.e. $S=\{w_1^s, w_2^s, \ldots, w_{l_s}^s\}$, wherein the sentence comprises $l_s$ words. Equation (1) then becomes $$sim(s_i, s_j) = \frac{|S_i \cap S_j|}{\sqrt{|S_i| \times |S_j|}} \qquad (2)$$

where (2) is an example of a cardinality-based similarity measure. Other cardinality-based similarity measures are shown in Table 1.

In other words, the cosine similarity can be determined by dividing the size of the intersection of the two sentences by the square root of multiplication of the magnitude of the two sentences. The Jaccard similarity can be determined by dividing the size of the intersection of the two sentences by the size of the union of the two sentences. The Sørensen-Dice coefficient can be determined by multiplying the size of the intersection of the two sentences by two and dividing it by the sum of the magnitude of each sentence. The overlap coefficient can be determined by dividing size of the intersection of the two sets by the smaller of the size of the two sets.

While these cardinality-based coefficients are effective at determining the similarity between clearly defined sets, they are quite crisp, black-and-white measures. They are therefore not particularly well suited to determining similarity in more nuanced cases, such as in natural language processing. For instance, the sentences 'she likes dogs' and 'he loves cats' have a similarity of 0 using the measures shown in Table 1, which does not properly reflect the human understanding of the concept.

Accordingly, there is a need for a more effective measure of similarity between phrases or sentences that is able to cope with more subtle forms of similarity.

In the next section this problem is alleviated by fuzzifying the sets $S_i$ and $S_j$ using word embeddings.

The Fuzzification Procedure

Fuzzy set theory is a formalism that extends classic set theory by incorporating the idea that elements can have degrees of membership in a set. The following description illustrates how distributed representations naturally induce membership functions for fuzzy sets of words, thus holding potential to extend count-based methods to incorporate the rich notions of similarity encoded in these embeddings.

To introduce the setting formally, let sentence $S=\{w_1^s, w_2^s, \ldots, w_{l_s}^s\}$ be given by a set of words. First, S is rewritten as a union of single-word sets (singletons), i.e.

$$S=\{w_1^s\}\cup\{w_2^s\}\cup\ldots\cup\{w_{l_s}^s\}=S_{w_1}\cup S_{w_2}\cup\ldots\cup S_{w_l}$$

where the order is arbitrary.

Let $U=\{\{w\}|w\in V\}$ be a collection of singletons and let $M_{[0,1]}^V$ denote a set of all possible membership functions $\mu(w): V \mapsto [0,1]$. A membership function, $\mu(w)$ denotes the degree of membership (between 0 and 1). In this case, each word in the vocabulary has its own membership function that outputs the degree of similarity between the respective word to a given word.

A word fuzzifier is defined to be a function $\mathcal{F}: U \mapsto M_{[0,1]}^V$. This takes each singleton in the sentence S and outputs a membership function. The membership function for a word can be viewed as a vector where each component of the vector represents the similarity between the word and a respective word in the overall vocabulary.

A trivial example of a fuzzifier is given by $$\mathcal{F}(\{w_i\})(w_j)=\delta_{ij}$$

where $\delta_{ij}$ is the Kronecker delta. That is, the fuzzifier $\mathcal{F}(\{w_i\})(w_j)$ equals 1 for each word in the vocabulary $V=\{w_1, w_2, \ldots, w_N\}$ that is the same as $w_j$, otherwise the fuzzifier equals zero. Standard crisp representations such as BoW are therefore a subset of this formalism.

One reasonable way to construct a word fuzzifier is by using a word embedding model. Let $W \in \mathbb{R}^{|V| \times d}$ be a word embedding matrix of real numbers of dimension equal to $|V| \times d$, which is the size of the vocabulary V multiplied by the dimension d of the word embedding vectors (the number of embedding parameters within each vector). The $i^{th}$ row $W_i$ contains the word representation for word $w_i$.

By multiplying the word vector for a given word with the word embedding matrix, a word embedding of the word vector is produced.

Based on the above, the membership function for a singleton $\{w_i\}$ (a given word) with cosine similarity as the similarity measure between words is then $$\mu_{w_i}(w_j) = \frac{\cos(W_i, W_j)+1}{2} \qquad (3)$$

The membership function, when applied to compare two different words $w_i$, $w_j$ returns the membership degree of word $w_j$ in the fuzzy set singleton $\{w_i\}$. In other words, this membership function returns the degree of similarity between the two words.

While functions $\mathcal{F}$ allow us to fuzzify singletons, it is more useful to produce fuzzy representations of entire sentences S. Each word in S induces a degree of membership for other words in the vocabulary, governed by their similarity. In order to determine the degree of membership of a word in the entire sentence, an operation akin to a union of all singletons in S is required.

In fuzzy set theory this corresponds to performing a logical disjunction, which can be realised by any triangular (t-)conorm, denoted as $\perp$. The Gödel t-conorm can be used. This takes the max of all the membership functions.

In the embodiments described herein, a sentence fuzzifier is defined as the pair ($\mathcal{F}, \perp$). This is the combination of the functions $\mathcal{F}$ for fuzzifying singletons and the corresponding T-conorm ($\perp$).

As a concrete example, let $\perp_{max}(x, y)=\max(x, y)$. That is, the t-conorm for the word vectors x and y returns the elementwise maximum of the components of x and y. The membership function for S is then given by $$\mu_S(w) = \max_{w_i^s \in S} \mu_{w_i^s}(w) \qquad (4)$$

that is, the membership function for the sentence is calculated by taking the maximum of the membership functions for each word in the sentence.

The degree of membership for each word is the maximum degree of membership induced by any singleton $\{w_i^s\}$ in the sentence, which intuitively makes sense.

In the embodiments described herein, the fuzzy set $A_S=(V, \mu_S)$ is called a fuzzification of S.

The vocabulary V serves as a universe and the membership function $\mu_S(w)$ of a sentence S denotes how much of each word $w \in V$ is contained in S.

The cardinality of $A_S$ is given by $$|A_S| = \sum_{w \in V} \mu_S(w) \quad (5)$$

that is, cardinality of $A_S$ is the sum of the values of the membership function applied to each of the words in the vocabulary. $|A_S|$ is called the fuzzy cardinality of S.

For a chosen t-conorm, T, such as max, which corresponds to a fuzzy union operation, there exists a corresponding t-norm, $\perp$, that performs an intersection of two fuzzy sets. In this case this t-norm is min, but other pairs of t-norm and t-conorm are also suitable candidates. Using a t-norm, t-conorm pair $(T, \perp)$ (e.g. the (min, max) pair) the fuzzy versions of various cardinality-based similarity measures (see table 1) can be calculated.

For example, the Jaccard similarity becomes $$sim(s_i, s_j) = \frac{|\min(A_{S_i}, A_{S_j})|}{|\max(A_{S_i}, A_{S_j})|} \quad (6)$$

and the cosine similarity becomes $$sim(s_i, s_j) = \frac{|\min(A_{S_i}, A_{S_j})|}{\sqrt{|A_{S_i}| \times |A_{S_j}|}} \quad (7)$$

Using the presented framework the embodiments described herein solve the crispness problem of count-based models by leveraging the rich similarity structure encoded in the word embedding matrix. See Algorithm 1 for the implementation of a sentence fuzzifier and Algorithm 2 for the FUSS versions of the coefficients from Table 1.

Algorithm 2 makes use of algorithm 1 to calculate maximum set membership values $\mu_s^w$ for a given sentence when compared to a $\mu_s^w$ then word w in the vocabulary. The maximum set membership is a set of values comprising, for each word in the vocabulary, the maximum degree of similarity to any word in the sentence. That is, algorithm 1 calculates for each word in the vocabulary, a similarity value for each word in the sentence and then chooses the maximum similarity value.

The membership functions for the two sentences are then used to calculate a similarity score between the two sentences.

---

Algorithm 2 Fuzzy Set Similarity (FUSS)

Input: Sentence $s_i = u_1,...,u_k$, sentence $s_j = v_1,...,v_l$, vocabulary $w_1,...,w_n$, similarity measure SIM between words.

---

-continued

Algorithm 2 Fuzzy Set Similarity (FUSS)

Output: Similarity score JACCARD, COSINE, SDICE, OVERLAP
A ← {SF($s_i$, $w_1$),...,SF($s_i$, $w_n$)}
B ← {SF($s_j$, $w_1$),...,SF($s_j$, $w_n$)}
INTER ← {min($a_1$, $b_1$),...,min($a_n$, $b_n$)}
UNION ← {max($a_1$, $b_1$),...,max($a_n$, $b_n$)}
JACCARD ← ΣINTER/ΣUNION
COSINE ← ΣINTER/√ΣA × ΣB
SDICE ← 2ΣINTER/(ΣA + ΣB)
OVERLAP ← ΣINTER/min(ΣA,ΣB)

---

As the first step, algorithm 1 is used to calculate the maximum membership degree (or degree of similarity) for each word in the vocabulary based on the membership functions for each word in each sentence. This produces, for each word in the vocabulary, the maximum membership the word can have in the sentence.

In this case, membership values for the degree of similarity for the first sentence are labelled "A" and the membership values for the second sentence are labelled "B". For each sentence, and for each word in the vocabulary, the membership value is initially set to $-\infty$. For each word in the vocabulary, a similarity is calculated between the word and each word in the sentence. If the similarity is greater than the current highest similarity value for that word in the vocabulary, then the corresponding value in the sentence membership function is set equal to that similarity value. Otherwise, the similarity value is kept at $-\infty$. This method can be applied using any applicable similarity measure using any applicable membership function (e.g. cosine similarity, or dot product similarity, as discussed later).

The membership functions for each sentence are then used to calculate a similarity measure. Various sentence level similarity measures can be used, for instance, those shown in Table 1. These correspond to the functions shown algorithm 2. Namely, the Jaccard similarity is the calculated by calculating the intersection of the two sentences and the union of the two sentences. The intersection is calculated using a t-norm and the union is calculated using a t-conorm. In the case where the max and min t-conorm, t-norm pair is used, this equates to taking the elementwise maximum of A and B for the union and the piecewise minimum of A and B for the intersection. The fuzzy cardinality of the intersection is calculated by taking the sum over the intersection. Similarly, the fuzzy cardinality of the union is taken by taking the sum over the union. The Jaccard similarity is then the fuzzy cardinality of the intersection divided by the fuzzy cardinality of the union (equation 6).

Equally, the cosine similarity is the sum over the intersection divided by the square root of the multiple of the sum of A and the sum of B (equation 7). The Sørensen-Dice similarity can be calculated by taking the sum over the intersection, multiplying it by two and dividing this by the sum of A added to the sum of B. The overlap similarity can be calculated by taking the sum over the intersection and dividing this by the minimum of the sum over A and the sum over B.

Some extensions to the above methodology are described below.

Dot Product

A generalisation of the above embodiments removes the restrictions of the codomain of the membership functions and considers a family $\mu(w): V \mapsto \mathbb{R}$. That is, the values of the membership functions can be any real values, (i.e. they are not restricted to values between 0 and 1). The membership function for $\{w_i\}$ then becomes $$\mu_{w_i}(w_j) = W_i \cdot W_j \qquad (8)$$

that is, the membership function is the dot product of the word embeddings (e.g. taken from the word matrix).

This is beneficial as the dot product may in many cases be an optimal measure with respect to the loss of the underlying model. It is perhaps counter-intuitive to express the degree of membership in a set with a real (potentially negative) value. Yet it has been found that the embodiments that utilise dot product perform considerably better in practice.

Incorporating Weights

Simple measures for similarity benefit from incorporating additional information about words, for example weightings relating to their (relative) frequency. The framework presented above can be extended to incorporate such weights. Suppose each word $w_i$ is given a weight $\alpha_i$. Then $$\mu_{w_i}(w_j) = \alpha_i \alpha_j W_i \cdot W_j \qquad (9)$$

that is, the membership function is the dot product of the word embeddings multiplied by the multiple of the two weights.

Improvements to Efficiency

Thus far, $W \in \mathbb{R}^{|V| \times d}$ has been considered to be the entire word embedding matrix. The method can be limited to only a subset of the rows (words). In fact, performance can be much improved on STS tasks when W contains embeddings of only those words that appear in a given sentence pair $s_i$, $s_j$ (i.e. no additional words from the vocabulary are needed). Putting it differently, if $\mu_1, \ldots, \mu_{l_i}$ and $v_1, \ldots v_{l_j}$ are the embeddings of words in the sentences $s_i$ and $s_j$ respectively, then $W \in \mathbb{R}^{l_i + l_j \times d}$ is simply $$W = [u_1; \ldots; u_{l_i}; v_1; \ldots; v_{l_j}] \qquad (10)$$

This provides a simple and fast algorithm for calculating the semantic similarity between two sentences.

Generation of Similarity Measure

The embodiments described herein introduce similarity models that solve the crispiness problem of count-based models and leverage the entirety of the word embedding matrix. These provide efficient and effective mechanisms for determining the similarity between two phrases. The similarity can be utilised within human to machine interfaces, and in particular, chatbots.

FIG. 1 shows a system in accordance with a first embodiment, the system comprises a user interface 1 for use by a user 3. The user interface 1 may be provided on a mobile phone, the user's computer or other device capable of hosting a web application with a voice input and transmitting a query across the internet.

The user 3 inputs a query into the interface and this is transmitted across the internet 5 to a conversation handling service 7. The conversation handling service 7 sends the query to an embedding service 9. The conversation handling service 7 may be provided with simple logic which allows the device to, for example, direct the user 3 to a human operator if required etc. The embedding service 9 generates a vector representation for the input query. The embedding service 9 generates vector representations based on machine learning models that have been trained on training data. In this case, the models are also evaluated by a medical professional.

The embedding service 9 submits the generated vector representation to a content retrieval service 11. The content retrieval service 11 reads a content database 13 and compares the vector representation of the input query, (which will be referred to hereinafter as the input vector representation) to other vector representations in the database. The content retrieval service 11 determines whether the input vector representation is similar to other vector representations within the content database 13. The content retrieval service may be implemented on a computing system comprising a processor and memory.

In an embodiment, the input vector representation determined to be similar to other vector representations, then content associated with the similar vector representations is passed back to the user 3 via the interface 1, where it is displayed. The content may be directed to the user 3 via the embedding service 9 or may be sent direct to the interface 1.

In a further embodiment, if no sufficiently similar content is in the content database, the query is passed to the content authoring service 15. The content authoring service groups similar queries into clusters. If the size of a cluster exceeds a threshold, it is determined that content for these similar queries needs to be generated. In an embodiment, this content will be generated by a medical professional 17. Once validated, the new content is added to the content database 13.

After being presented with suitable content (existing or new), the user 3 may select a "call to action" which is submitted to the conversation handling service 7. The conversation handling service may communicate with other internal services (e.g. a diagnostic engine 19) to satisfy the user request.

The present embodiment relates to an interface for handling medical queries based on content that is authored by a medical professional; however, it will be appreciated that this can equally be applied to any type of query for any type of content.

It can be seen from the above description that the effectiveness of retrieval of responses to queries depends strongly on the ability to determine the similarity between the queries and predetermined queries (that have predetermined responses) stored in the content database 13. The embodiments described herein aim to improve the ability determine this similarity by fuzzifying the similarity for vector representations for the input phrases.

Figure 2:
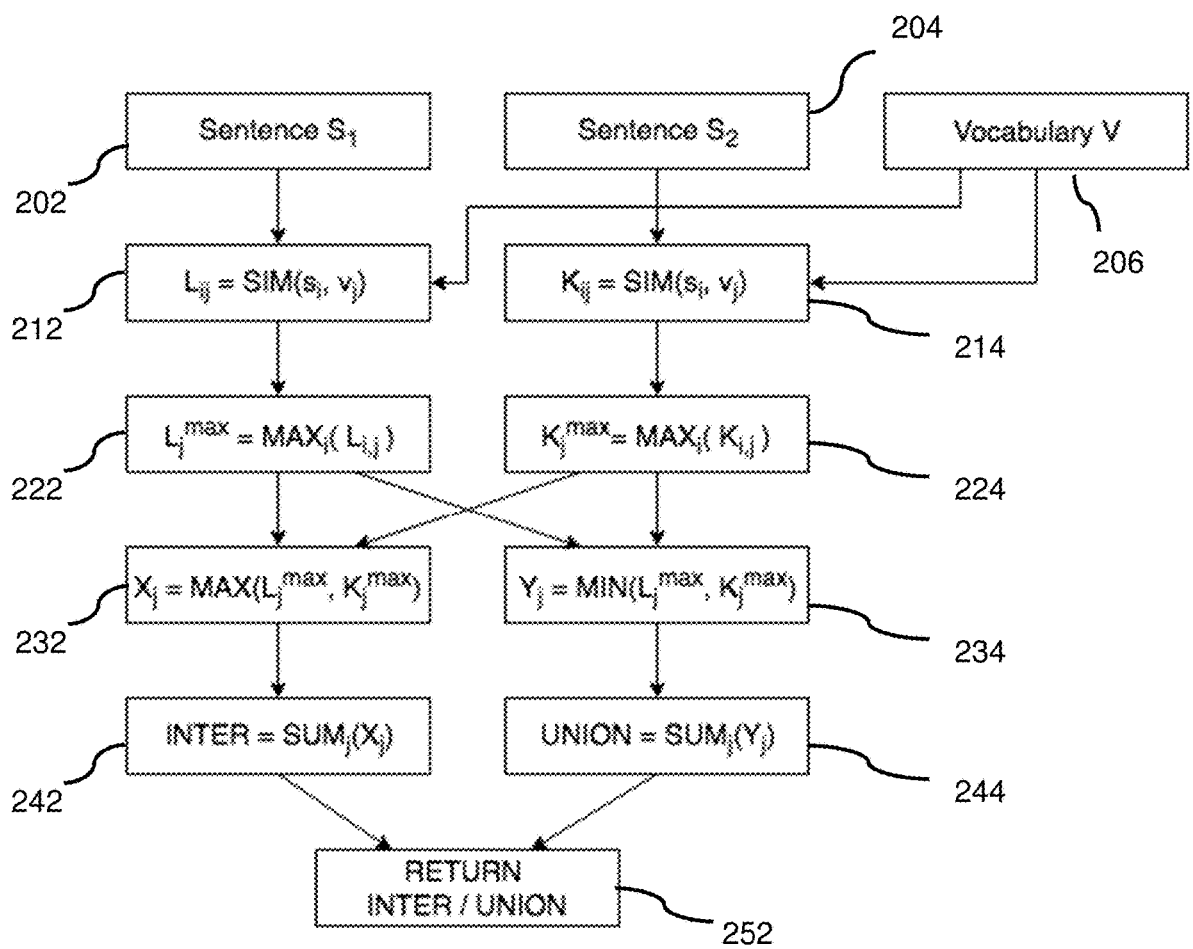
FIG. 2 shows a method for determining the similarity between two phrases according to an embodiment.

FIG. 2 shows a method for determining the similarity between two phrases according to an embodiment. This depicts the Jaccard similarity embodiment utilising the Gödel t-conorm as per algorithms 1 and 2.

Firstly, two sentences for comparison $S_1$ and $S_2$ are input 202, 204 along with a vocabulary V 206. Each sentence is input as a sequence of one-hot word vectors. For each word in each sentence, an embedding is determined. By multiplying the one-hot vector for a given word with a word embedding matrix, a word embedding of the word vector is produced. Alternatively, this can be achieved by looking up the corresponding word embedding from storage.

Then, similarity values $L_{ij}$ 212 are determined for the first sentence and similarity values $K_{ij}$ are determined for second sentence 214. The sets of similarity values are equivalent to the values for the degree of similarity (the membership degree) of inputs A and B in algorithm 2. For each sentence, the set of similarity values comprise a degree of similarity for each word in the vocabulary compared to each word in the sentence. These are determined using an appropriate membership function, for instance, the cosine membership function in equation (3), or the dot product membership functions of equations (8) or (9).

Then the similarity between the two sentences is determined based on the similarity values for each sentence and an appropriate cardinality-based similarity metric (e.g. one of the metrics from Table 1).

In the present embodiment, the Jaccard similarity is calculated. Accordingly, the intersection and union between the two sentences is calculated. To achieve this, the maximum similarity values between each word in the vocabulary and each word in the sentence are required. As discussed earlier, this calculates a union of words to construct a sentence membership function. Accordingly, for each word in the vocabulary, the set of similarity values relative to the words in the first sentence are retrieved and the highest similarity value is chosen 222. That is, for each word in the vocabulary the maximum similarity value is determined relative to each word in the sentence. In other words, for each word in the vocabulary, the similarity value for the most similar word in the sentence is returned. This provides a set of maximum similarity values for the first sentence (a membership function for the first sentence). This step is then repeated for the second sentence 224 to produce a set of maximum similarity values for the second sentence (a membership function for the second sentence). These two sentence membership functions are then used to calculate the intersection and union between the two sentences.

To calculate the union, the elementwise maximum is taken across the two sentence membership functions (the two sets of maximum similarity values). That is, for each word, the maximum similarity value for each sentence is retrieved and the highest value is chosen 232. In other words, for each word, the highest similarity value from the similarity values for each word in the two sentences is picked. The highest similarity values for each word in the vocabulary are then added together to calculate the intersection between the two sentences 242.

To calculate the intersection, the elementwise minimum is taken across the two sets of maximum similarity values. That is, for each word, the maximum similarity value for each sentence is retrieved and the lowest value is chosen 234. The lowest similarity values are then added together to calculate the union between the two sentences 244.

The similarity between the two sentences is then determined 252 by dividing the intersection by the union.

By making use of word embeddings and cardinality-based similarity measures, the embodiment of FIG. 2 provides an effective method for determining the similarity between two sentences.

Whilst the embodiment of FIG. 2 makes use of the Jaccard similarity, alternative cardinality-based similarity measures may be used. Furthermore, whilst the embodiment of FIG. 2 includes the input of a vocabulary, alternative embodiments instead utilise a vocabulary made up from the words from the two sentences. Alternatively, the vocabulary can comprise the words from the two sentences and a set of additional words.

Figure 3:
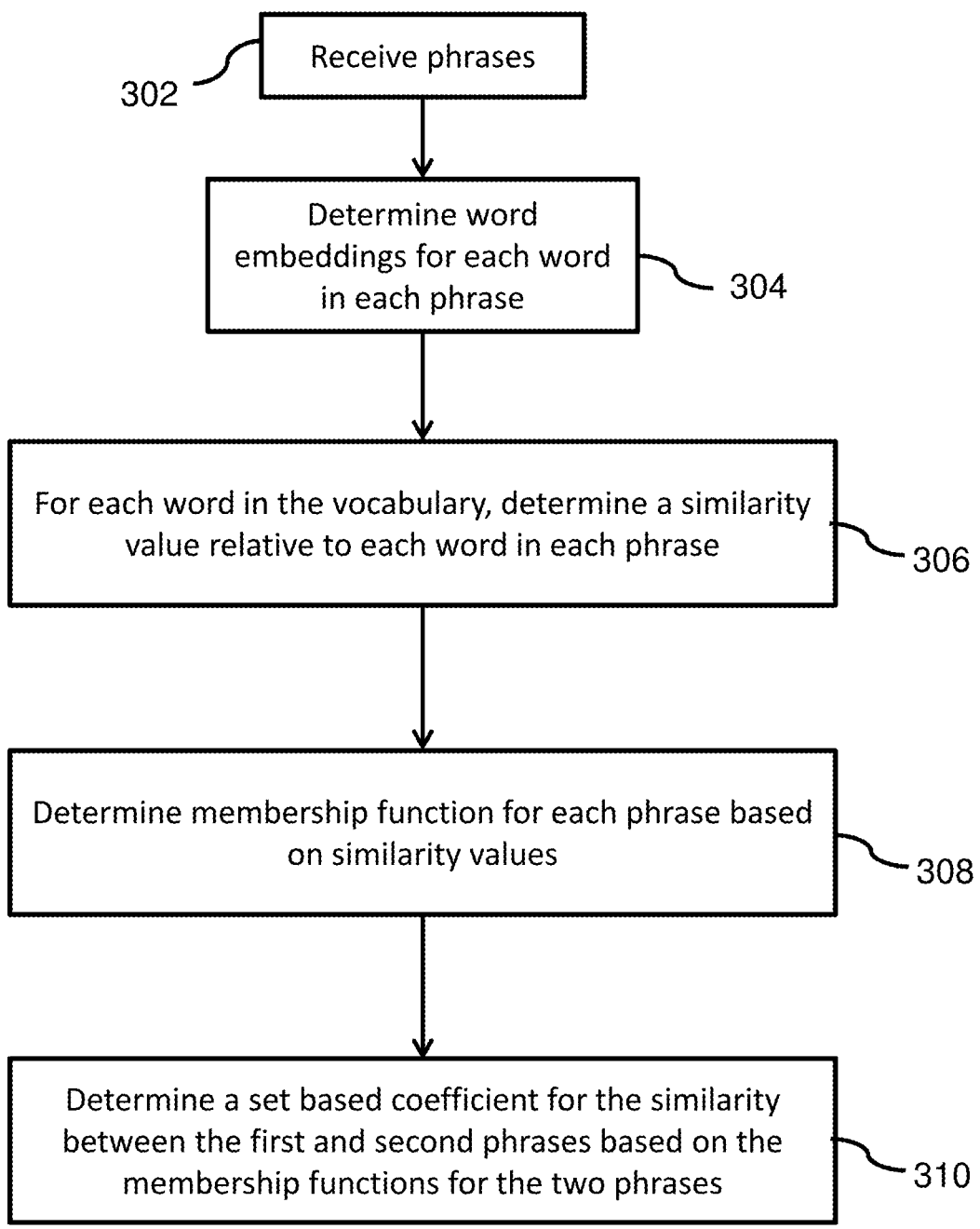
FIG. 3 shows a general method for determining the similarity between two phrases according to an embodiment.
Figure 4A:
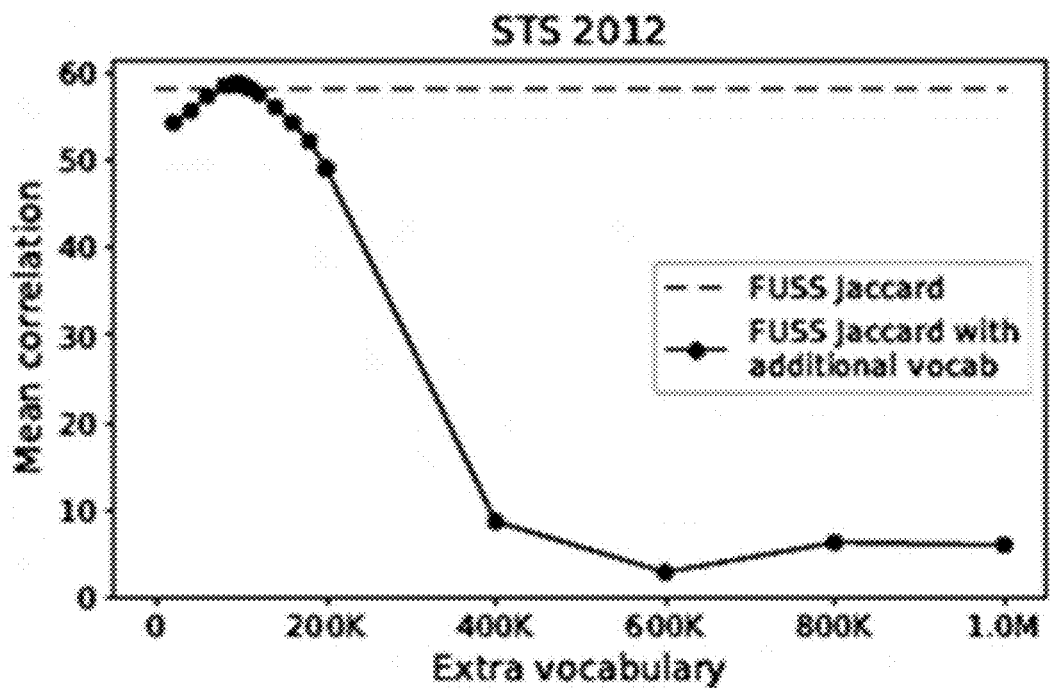
FIGS. 4A-E show how mean correlation varies based on vocabulary size for embodiments utilising the Jaccard similarity across STS'12 to STS'16.
Figure 4B:
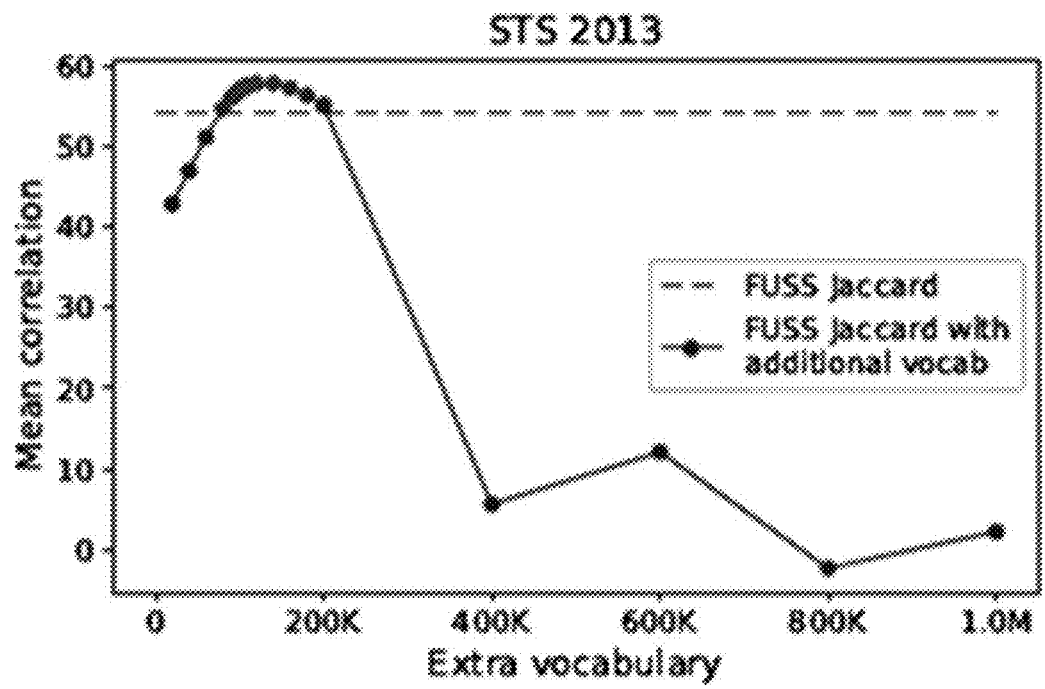
Figure 4C:
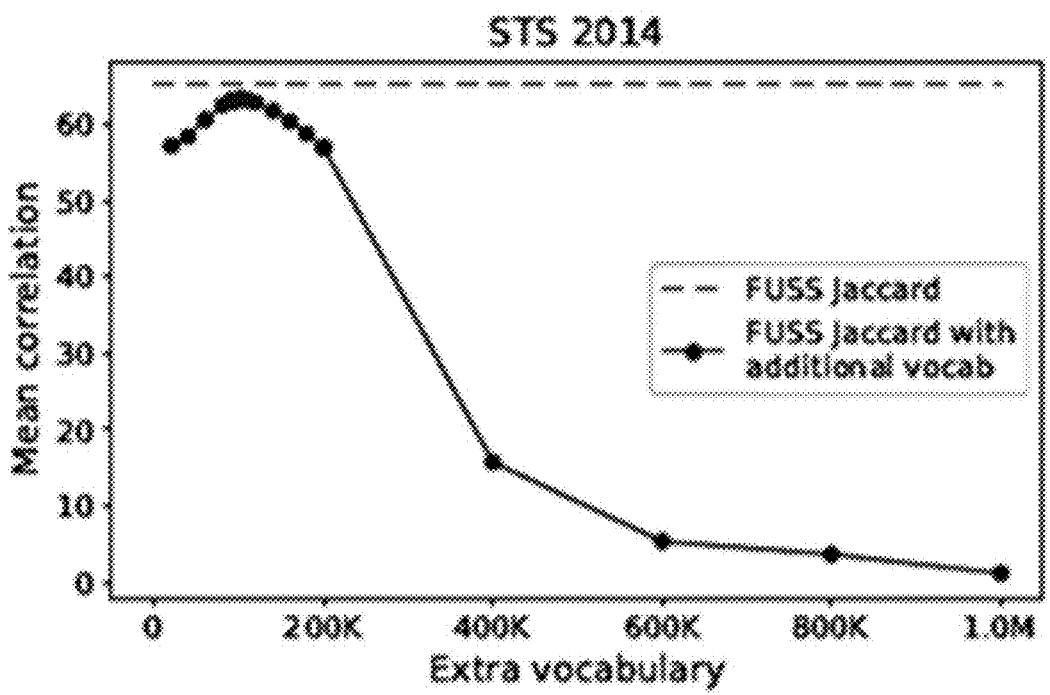
Figure 4D:
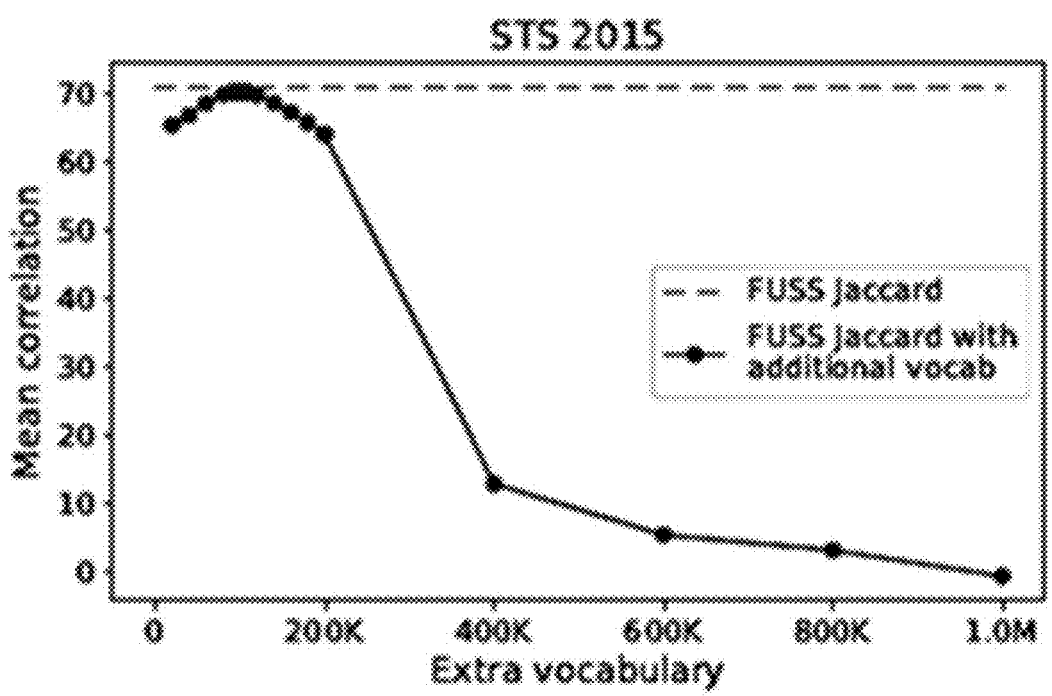
Figure 4E:
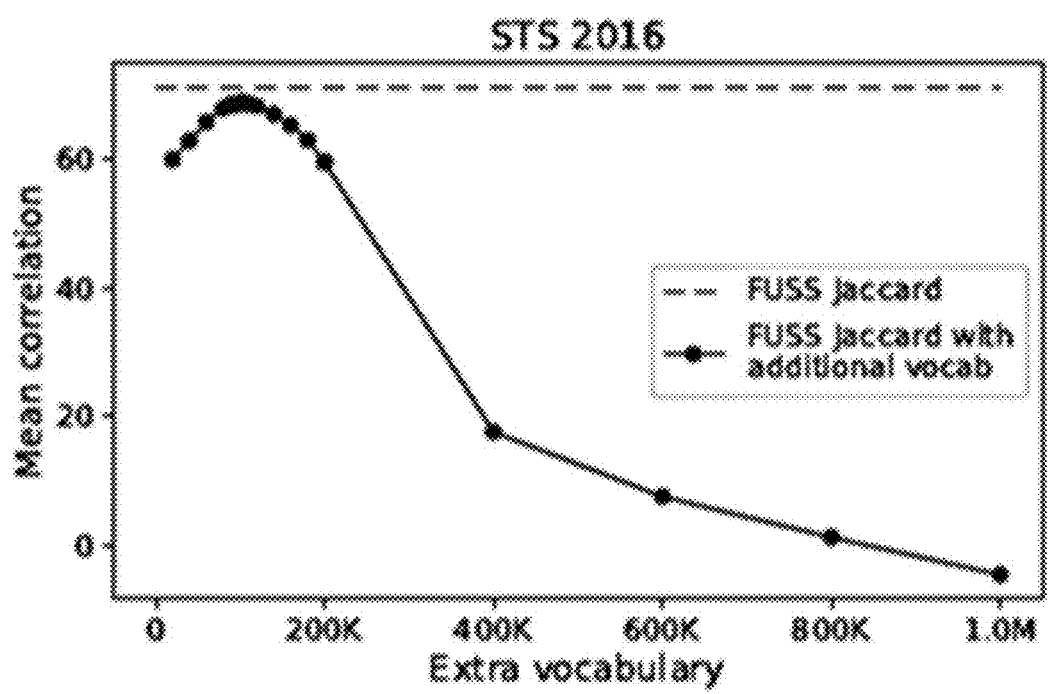

FIG. 3 shows a general method for determining the similarity between two phrases according to an embodiment.

Initially, two or more phrases (sets of words) for comparison are received 302. In the present embodiment, two phrases are compared.

For each word in each phrase a corresponding word embedding is determined 304. This may be achieved via an embedding matrix.

For each word in the vocabulary, a similarity value is determined relative to each word in the phrase 306. This may be achieved, for example, by determining the cosine similarity of the corresponding word embedding vectors or applying dot-product multiplication to the corresponding word embedding vectors.

Then a membership function is determined for each phrase based on the similarity values for the words in the phrase 308. This is achieved by picking, for each word in the vocabulary, the maximum similarity value with respect to the words in the phrase.

Finally, a set based coefficient for the similarity between the first and second phrases is determined based on the membership functions for the two phrases 310. This can make use of any of the cardinality based measures shown in Table 1, or any other set-based measure.

By providing a more effective method of determining the similarity between sentences, the embodiments described herein provide improvements in natural language processing that can be applied in various fields, including the generation of artificial conversation.

Whilst the above description discusses "sentences", this can equally be applied to any phrases or combinations of words.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Performance Improvements

To evaluate the proposed measures, a series of experiments were setup on unsupervised semantic textual similarity tasks. The test implementation wrapped the SentEval toolkit and relied on pre-trained word embeddings, namely GloVe word vectors and Paragram Paraphrase (PP) word vectors. The word frequencies of an English Wikipedia dump dated $1^{st}$ Jul. 2017 were estimated and only the words that appear in the GloVe vocabulary were kept.

In the experiments involving fuzzy set similarity measures, documents are represented as fuzzy sets of words where the membership function is based on the dot product between embeddings, as described herein. Furthermore, when evaluating the experiments, the special case discussed above where W contains embeddings of only those words that appear in a given sentence pair $s_i$, $s_j$ is used, unless otherwise stated.

To level any possible discrepancies in the experimental setup (preprocessing, embeddings, word frequencies, etc.) used here and in other studies, the results for the average word vector were re-computed with copies of the embeddings and word frequencies used in the present embodiment. These re-computed experiments are marked with a † in all the result tables. Finally, as the STS'13 SMT dataset is no longer publicly available, it was excluded from all experiments and the mean Pearson correlations reported in other studies involving this task have been recalculated accordingly. Mean STS'13 values adjusted for the missing SMT data are indicated by ‡.

The first experiment uses GloVe embeddings and compares the four fuzzy set similarity metrics introduced in Algorithm 2 to the average word vector. The results of this experiment are shown in Table 2.

The results show that the embodiments (utilising FUSS techniques) outperform the average word vector in almost all the cases (FUSS Overlap being the notable exception in a couple of the tasks). Moreover, FUSS Jaccard appears to be the best choice overall. This performance is mostly improved upon by adding word frequency weights as discussed above. The results in Table 3 show that the FUSS Jaccard similarity with word frequency weights performs better than average word vector with the same weights as well as other weights reported in Arora et al. (Sanjeev Arora, Yingyu Liang, and Tengyu Ma. 2017. A Simple but Tough-to-Beat Baseline for Sentence Embeddings. Int. Conf. Learn. Represent. pages 1-14.).

Table 3 shows that the boosted version of the method outperforms the competing methods overall. In addition, it should be noted that the methods described herein can be applied to sentences in real-time and can therefore be implemented in a wider variety of scenarios, such as use in chatbots or information retrieval.

TABLE 2

A comparison of the FUSS special case metrics based on the four cardinality coefficients showin Table 1 and an average word vector approach. The reported values are Pearson correlation based on the STS 2012-2016 datasets, scaled between 0 and 100. The averages for the STS 13 task do not include the SMT subtask.

| Approch | avg-GloVe† | Jaccard | Cosine | Overlap | Dice |
|---|---|---|---|---|---|
| MSRpar | 42.55 | 49.39 | 49.26 | 45.37 | 49.14 |
| MSRvid | 66.21 | 71.92 | 71.65 | 70.64 | 71.54 |

TABLE 2-continued

A comparison of the FUSS special case metrics based on the four cardinality coefficients showin Table 1 and an average word vector approach. The reported values are Pearson correlation based on the STS 2012-2016 datasets, scaled between 0 and 100. The averages for the STS 13 task do not include the SMT subtask.

| Approch | avg-GloVe† | Jaccard | Cosine | Overlap | Dice |
|---|---|---|---|---|---|
| SMTeuroparl | 48.36 | 48.49 | 48.26 | 38.93 | 48.46 |
| surprise.OnWN | 57.03 | 69.85 | 70.49 | 57.54 | 70.36 |
| surprise.SMTnews | 46.27 | 51.45 | 52.09 | 34.27 | 52.80 |
| STS 12 | 52.08 | 58.22 | 58.35 | 49.35 | 58.46 |
| FNWN | 38.21 | 39.76 | 40.11 | 13.12 | 40.13 |
| OnWN | 47.20 | 52.11 | 50.81 | 54.68 | 50.37 |
| headlines | 63.39 | 69.92 | 69.26 | 69.66 | 69.12 |
| STS 13‡ | 49.60 | 53.93 | 53.40 | 45.82 | 53.20 |
| OnWN | 57.71 | 63.00 | 62.18 | 63.78 | 61.84 |
| deft-forum | 30.02 | 43.24 | 42.64 | 48.63 | 42.03 |
| deft-news | 64.95 | 70.56 | 70.58 | 64.18 | 70.57 |
| headlines | 58.67 | 64.49 | 64.96 | 64.18 | 64.84 |
| images | 62.38 | 75.05 | 75.39 | 74.20 | 75.28 |
| tweet-news | 53.87 | 74.32 | 75.65 | 71.62 | 75.02 |
| STS 14 | 54.60 | 65.11 | 65.23 | 64.43 | 64.93 |
| answers-forums | 36.66 | 61.97 | 61.57 | 58.89 | 61.31 |
| answers-students | 63.62 | 73.53 | 72.57 | 62.85 | 72.50 |
| belief | 44.78 | 67.20 | 66.21 | 66.76 | 65.86 |
| headlines | 66.21 | 72.26 | 72.24 | 71.67 | 72.15 |
| images | 69.09 | 79.31 | 78.77 | 76.87 | 78.72 |
| STS 15 | 56.07 | 70.85 | 70.27 | 67.41 | 70.11 |
| answer-answer | 40.12 | 59.72 | 59.35 | 47.62 | 59.08 |
| headlines | 61.38 | 71.70 | 70.76 | 67.25 | 70.84 |
| plagiarism | 54.61 | 79.92 | 80.22 | 78.57 | 80.03 |
| postediting | 53.88 | 80.49 | 78.88 | 71.14 | 78.99 |
| question-question | 47.21 | 63.50 | 63.49 | 62.47 | 63.12 |
| STS 16 | 51.44 | 71.07 | 70.54 | 65.41 | 70.41 |

As the embeddings used for FUSS measures can be considered a hyperparameter, it is important to note their role in the method performance. Replacing the GloVe embeddings with the PP embeddings led to another gain in performance as seen in Table 4.

TABLE 3

Values show mean Pearson correlations (scaled between 0 and 100) on the STS datasets. This is an extension of Table 5 in Arora et al. ((2017). The Baseline columns show the results of our replication of the average vector. The FUSS columns present our Fuzzy Set Similarity approaches.

| | Arora et al. (2017) | | | | | Baseline | | FUSS | |
|---|---|---|---|---|---|---|---|---|---|
| Approach | ave-GloVe | mdf-GloVe | GloVe + W | GloVe + R | GloVe + WR | avg-GloVe† | GloVe + W† | GloVe J | GloVe J + W |
| MSRpar | 47.70 | 50.30 | 43.60 | 36.40 | 35.60 | 42.55 | 41.80 | 49.39 | 44.09 |
| MSRvid | 63.90 | 77.90 | 78.70 | 79.40 | 83.80 | 66.21 | 80.04 | 71.92 | 82.06 |
| SMT-eur | 46.00 | 54.70 | 51.10 | 48.50 | 49.90 | 48.36 | 50.72 | 48.49 | 48.79 |
| OnWN | 55.10 | 64.70 | 54.30 | 68.30 | 66.20 | 57.03 | 66.40 | 69.85 | 70.62 |
| SMT-news | 49.60 | 45.70 | 42.20 | 45.60 | 45.60 | 46.27 | 51.43 | 51.45 | 55.76 |
| STS 12 | 52.50 | 58.70 | 54.00 | 55.60 | 56.20 | 52.08 | 58.08 | 58.22 | 60.27 |
| headline | 63.80 | 69.20 | 63.80 | 68.90 | 69.20 | 63.39 | 67.64 | 69.92 | 72.74 |
| OnWN | 49.00 | 72.90 | 68.00 | 75.40 | 82.80 | 47.20 | 65.83 | 52.11 | 64.95 |
| FNWN | 34.20 | 36.60 | 23.00 | 34.90 | 39.40 | 38.21 | 43.31 | 39.76 | 41.61 |
| STS 13† | 49.30 | 59.56 | 51.60 | 59.73 | 63.60 | 49.60 | 58.93 | 53.93 | 59.77 |
| deft forum | 27.10 | 37.50 | 29.10 | 39.80 | 41.20 | 30.32 | 36.58 | 43.24 | 45.60 |
| deft news | 68.00 | 68.70 | 68.50 | 66.60 | 69.40 | 64.95 | 68.91 | 70.56 | 73.43 |
| headline | 59.50 | 63.70 | 59.30 | 64.60 | 64.70 | 58.67 | 62.80 | 64.49 | 67.22 |
| images | 61.00 | 72.50 | 74.10 | 78.40 | 82.60 | 62.38 | 75.34 | 75.05 | 80.05 |

TABLE 3-continued

Values show mean Pearson correlations (scaled between 0 and 100) on the STS datasets. This is an extension of Table 5 in Arora et al. ((2017). The Baseline columns show the results of our replication of the average vector. The FUSS columns present our Fuzzy Set Similarity approaches.

| Approach | Arora et al. (2017) | | | | | Baseline | | FUSS | |
|---|---|---|---|---|---|---|---|---|---|
| | ave-GloVe | mdf-GloVe | GloVe + W | GloVe + R | GloVe + WR | avg-GloVe† | GloVe + W† | GloVe J | GloVe J + W |
| OnWN | 58.40 | 75.20 | 68.00 | 77.60 | 82.80 | 57.71 | 71.81 | 63.00 | 73.60 |
| tweet news | 51.20 | 65.10 | 57.30 | 73.20 | 70.10 | 53.87 | 59.67 | 74.32 | 73.46 |
| STS 14 | 54.20 | 63.80 | 59.40 | 66.70 | 68.50 | 54.60 | 62.52 | 65.11 | 68.89 |
| answers-forum | 30.50 | 45.60 | 41.40 | 58.40 | 63.90 | 36.66 | 43.84 | 61.97 | 64.09 |
| answers-student | 63.00 | 63.90 | 61.50 | 73.20 | 70.40 | 63.62 | 67.19 | 73.53 | 69.94 |
| belief | 40.50 | 49.50 | 47.70 | 69.50 | 71.80 | 44.78 | 51.23 | 67.20 | 67.46 |
| headline | 61.80 | 70.90 | 64.00 | 70.10 | 70.70 | 66.21 | 69.89 | 72.26 | 74.38 |
| images | 67.50 | 72.90 | 75.40 | 77.90 | 81.50 | 69.09 | 77.29 | 79.31 | 83.17 |
| STS 15 | 52.70 | 60.60 | 58.00 | 69.80 | 71.70 | 56.07 | 61.89 | 70.85 | 71.81 |
| answer-answer | — | — | — | — | — | 40.12 | 44.31 | 59.72 | 54.01 |
| headlines | — | — | — | — | — | 61.38 | 66.99 | 71.70 | 72.76 |
| plagiarism | — | — | — | — | — | 54.61 | 73.07 | 79.92 | 79.71 |
| postediting | — | — | — | — | — | 53.88 | 63.89 | 80.49 | 77.45 |
| question-question | — | — | — | — | — | 47.21 | 59.99 | 63.50 | 70.69 |
| STS 16 | — | — | — | — | — | 51.44 | 61.65 | 71.07 | 70.92 |

Further experiments were conducted to compare the test implementation with more sophisticated methods than the average vector representation. The results reported by Arora et al. and Wieting and Gimpel (John Wieting, Mohit Bansal, Kevin Gimpel, and Karen Livescu. 2015. *Towards Universal Paraphrastic Sentence Embeddings* pages 1-17) are used to present the comparison with additional methods in Table 4.

The following supervised methods were included in the study: PP mean vectors and PP mean vectors with a linear projection (Wieting et al., 2015); a Deep Averaging Network (Mohit Iyyer, Varun Manjunatha, Jordan Boyd-Graber, and Hal Daume III. 2015. Deep unordered composition rivals syntactic methods for text classification); a recurrent neural network RNN and an iRNN with the activation set as the identity, and the weight matrices initialized to identity; an LSTM as proposed by Gers et al. (Felix A. Gers, Nicol N. Schraudolph, and Jurgen Schmidhuber. 2003. *Learning precise timing with lstm recurrent networks*. J. Mach. Learn. Res. 3:115-143) with and without gated output.

TABLE 4

An extension of Table 1 from Arora et al. (2017) including results for FUSS Jaccard with an without word frequency weights. Values are Pearson correlations on STS 12-16 datasets, scaled between 0 and 100.

| Approach | STS 12 | STS 13‡ | STS 14 | STS 15 | STS 16 |
|---|---|---|---|---|---|
| PP | 58.7 | 61.3 | 70.9 | 75.8 | — |
| PP-proj. | 60 | 62.5 | 71.3 | 74.8 | — |
| DAN | 56 | 59.5 | 69.5 | 72.7 | — |
| RNN | 48.1 | 48.3 | 57.7 | 57.2 | — |
| iRNN | 58.4 | 62.5 | 70.9 | 75.6 | — |
| LSTM (no) | 51 | 50.2 | 59.8 | 63.9 | — |
| LSTM (o.g.) | 46.4 | 45.8 | 51.5 | 56 | — |
| Skip-Thought | 30.8 | 25.0 | 31.4 | 31 | — |
| avg-PSL | 52.8 | 51.56 | 59.5 | 60 | — |
| PSL + WR | 59.5 | 69.5 | 73.5 | 76.3 | — |
| mean-GloVe | 52.5 | 49.0 | 54.2 | 52.7 | — |
| tfidf-GloVe | 58.7 | 59.6 | 63.8 | 60.6 | — |
| GloVe + WR | 56.2 | 63.8 | 68.5 | 71.7 | — |
| GloVe fuss-J | 58.2 | 53.9 | 65.1 | 70.9 | 71.1 |
| GloVe fuss-J + W | 60.3 | 59.8 | 68.9 | 71.8 | 70.9 |
| PP fuss-J | 63.6 | 62.2 | 72.7 | 77.9 | 70.8 |
| PP fuss-J + W | 65.2 | 65.3 | 74.7 | 78.5 | 71.8 |

A number of unsupervised and semi-supervised methods were also included in the comparison: the celebrated Skip-Thoughts vectors (Ryan Kiros, Yukun Zhu, Ruslan Salakhutdinov, Richard S. Zemel, Antonio Torralba, Raquel Urtasun, and Sanja Fidler. 2015. Skip-Thought Vectors); an unweighted average of the GloVe vectors (Jeffrey Pennington, Richard Socher, and Christopher Manning. 2014. Glove: Global Vectors for Word Representation. In Proc. 2014 Conf. Empir. Methods Nat. Lang. Process. *Association for Computational Linguistics*, Stroudsburg, Pa., USA, pages 1532-1543); a weighted average of GloVe vectors using tf-idf weights; and an unweighted average of the PARAGRAMSL999 (PSL) vectors from Wieting et al. (2015) which were trained on labelled data.

Finally, a general case was tested where the vocabulary includes words not present in either sentence. A series of experiments were conducted where the vocabulary for each comparison included only the words present in a certain STS task, e.g. a comparison in the STS'12 would have a vocabulary with words only present in the STS'12 task. Additionally, the vocabulary was increased by adding the most frequent words from another larger vocabulary (in our case the GloVe vocabulary taken from the top). The general case of a vanilla FUSS Jaccard measure was tested on all five STS tasks; however, it was found to only be slightly beneficial in STS'13.

FIGS. 4A-E show how mean correlation varies based on vocabulary size for embodiments utilising the Jaccard similarity across STS'12 to STS'16. It can be seen that all curves peak at around 100 thousand additional words and then rapidly decline eventually leading to a long tail.

In light of the above, it can be seen that the embodiments described herein provide an improved means of determining similarity between sets of words.

Figure 5:
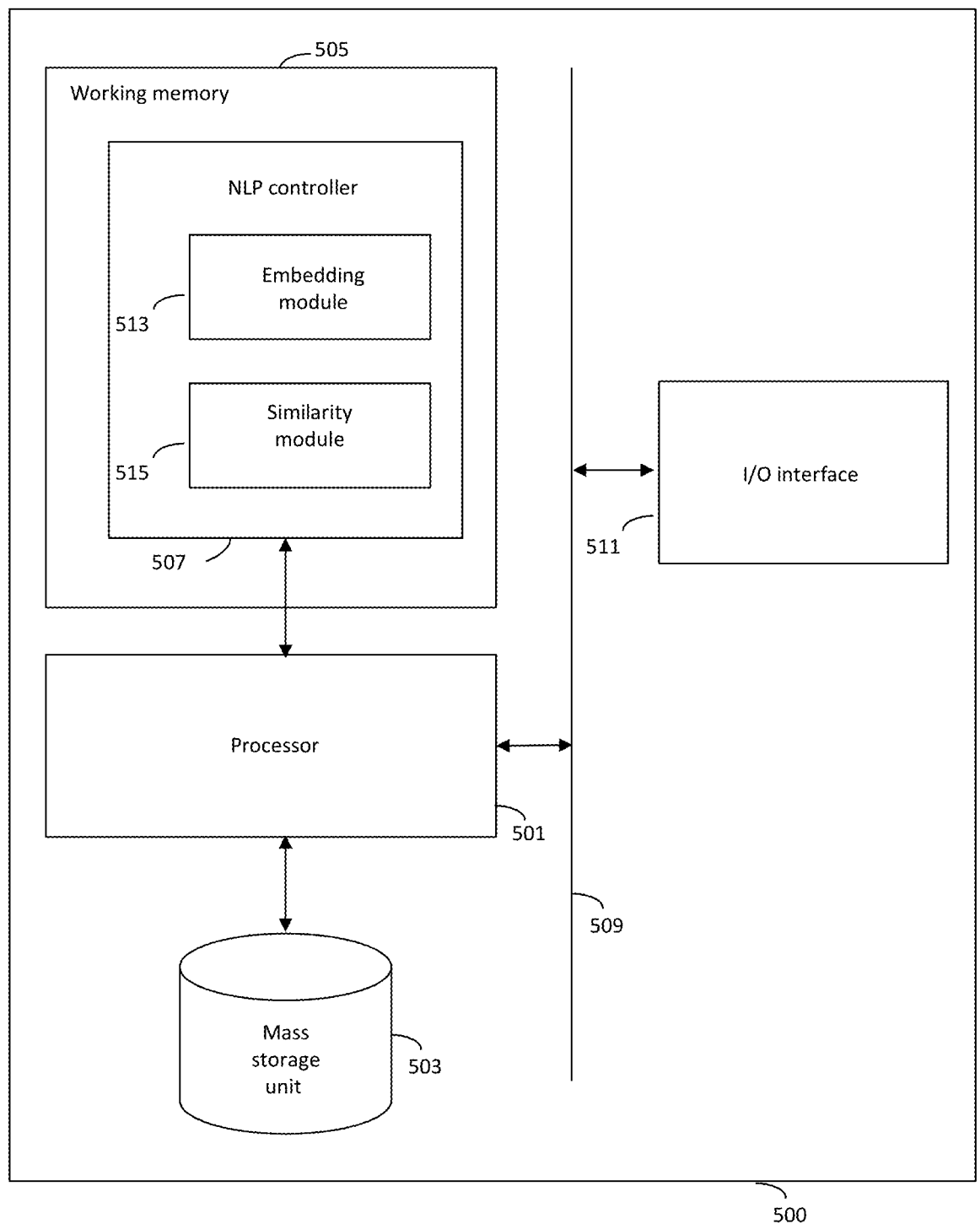
FIG. 5 shows an example computing system for putting the embodiments described herein into effect.

While the reader will appreciate that the above embodiments are applicable to any commuting system to determine similarity between sets of words, a typical computing system is illustrated in FIG. 5, which provides means capable of putting an embodiment, as described herein, into effect. As illustrated, the computing system 500 comprises a processor 501 coupled to a mass storage unit 503 and accessing a working memory 505. As illustrated, a natural language processing (NLP) controller 507 is represented as a software product stored in working memory 505. However, it will be appreciated that elements of the NLP controller 507 may, for convenience, be stored in the mass storage unit 503.

Usual procedures for the loading of software into memory and the storage of data in the mass storage unit 503 apply. The processor 501 also accesses, via bus 509, an input/output interface 511 that is configured to receive data from and output data to an external system (e.g. an external network or a user input or output device). The input/output interface 511 may be a single component or may be divided into a separate input interface and a separate output interface.

The NLP controller 507 includes an embedding module 513 and a similarity module 515. The embedding module 513 is operable to retrieve the sets of words for comparison and determine embedding vectors for the words (for instance, by multiplying word vectors for the words with an embedding matrix). The similarity module 515 is configured to determine the similarity between two sets of embedded vectors using the methods described herein. Thus, execution of the NLP software 507 by the processor 501 will cause embodiments as described herein to be implemented.

The NLP controller software 507 can be embedded in original equipment, or can be provided, as a whole or in part, after manufacture. For instance, the NLP controller software 507 can be introduced, as a whole, as a computer program product, which may be in the form of a download, or to be introduced via a computer program storage medium, such as an optical disk. Alternatively, modifications to an existing NLP controller 507 can be made by an update, or plug-in, to provide features of the above described embodiment.

The computing system 500 may be an end-user system that receives inputs from a user (e.g. via a keyboard) and determines similarity values (e.g. for determining a response to a query). Alternatively, the system may be a server that receives input over a network and determines the similarity values. Either way, these similarity values may be used to determine appropriate responses to user queries, as discussed with regard to FIG. 1.

For instance, the mass storage unit may store predefined phrases, and the system may be configured to determine similarity values with respect to an input phrase relative to each of the predefined phrases. The system may then be able to determine the most similar predefined phrase and then respond with a predefined response that is associated with that predefined phrase. The predefined phrases may be stored as sets of embedding vectors.

Accordingly, by providing more accurate and efficient means of determining the similarity between sets of words, the embodiments described herein provide improvements in natural language processing that, for instance, can improve the accuracy and efficiency of artificial conversational entities.

Whilst the embodiment of FIG. 5 includes an embedding module, alternative embodiments may receive embeddings for each word as an input. This may be the case where a separate system calculates the embedding vectors and provides these to the system for calculating the similarity between sets of embedding vectors.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer-implemented method for determining semantic similarity between a first set of words and a second set of words, the method comprising:
  receiving the first set of words and the second set of words, wherein the first and second sets of words are subsets of a vocabulary and each of the first and second sets of words comprise word embeddings corresponding to each word, the word embeddings comprising hidden parameters;
  determining a word membership function for each word in the first and second sets of words, wherein determining a word membership function for a word comprises determining a set of similarity values, each similarity value representing the semantic similarity between the word and a respective word in the vocabulary;
  determining a membership function for the first set of words and a membership function for the second set of words based on the determined word membership functions, wherein determining a membership function for the first and second sets of words comprises, for each of the first and second set of words, determining a set of similiarity values, each similiarity value representing the semantic similiarity between the respective set of words and a respective word in the vocabulary; and
  determining a set-based coefficient for the semantic similarity between the first and second sets of words based on the membership function for the first set of words and the membership function for the second set of words.

2. The method of claim 1 wherein determining a membership function for the first set of words and a membership function for the second set of words comprises, for each set of words, determining a fuzzy union between the word membership functions for the respective set of words.

3. The method of claim 2 wherein determining the fuzzy union between the word membership functions for the respective set of words comprises determining the triangular conorm between the word membership functions for the respective set of words.

4. The method of claim 3 wherein the triangular conorm is the maximum triangular conorm and wherein determining the fuzzy union between the word membership functions for the respective set of words comprises determining, for each word in the vocabulary, the maximum semantic similarity value taken from the semantic similarity values for the word relative to each word in the set of words.

5. The method of claim 1 wherein determining the set-based coefficient comprises determining the intersection between the first set of words and the second set of words.

6. The method of claim 1 wherein the set-based coefficient comprises one of a Jaccard similarity coefficient, a cosine similarity coefficient, a Sørensen-Dice similarity index and an overlap coefficient.

7. The method of claim 1 wherein determining the set-based coefficient comprises:
for each word in the vocabulary, determining a maximum semantic similarity value from the determined semantic similarity values for the first set of words relative to the respective word in the vocabulary;
for each word in the vocabulary, determining a maximum semantic similarity value from the determined semantic similarity values for the second set of words relative to the respective word in the vocabulary;
for each word in the vocabulary, determining a highest semantic similarity value taken from the maximum semantic similarity values for the word;
for each word in the vocabulary, determining a lowest semantic similarity taken from the maximum semantic similarity values for the word;
determining an intersection between the first and second sets of words by determining a sum of each of the lowest semantic similarity values;
determining a union between the first and second sets of words by determining a sum of each of the highest semantic similarity values; and
determining the set-based coefficient by dividing the intersection by the union.

8. The method of claim 1 wherein the semantic similarity values are determined based on a dot product membership function or a cosine membership function.

9. The method of claim 8 wherein the dot product membership function $\mu_{wi}$ between two word embeddings Wi and Wj is one of:

$$\mu_{w_i}(w_j) = W_i \cdot W_j$$

or $$\mu_{w_i}(w_j) = \alpha_i \alpha_j W_i \cdot W_j$$

wherein $\alpha i$ and $\alpha j$ are weights corresponding to Wi and Wj respectively.

10. The method of claim 8 wherein the cosine membership function $\mu_{wi}$ between two word embeddings Wi and Wj is:

$$\mu_{w_i}(w_j) = \frac{\cos(W_i, W_j) + 1}{2}$$

11. The method of claim 1 wherein the vocabulary consists of the first set of words and the second set of words.

12. A system for determining semantic similarity between a first set of words and a second set of words, the system comprising a processor configured to:
receive the first set of words and the second set of words, wherein the first and second sets of words are subsets of a vocabulary and each of the first and second sets of words comprise word embeddings corresponding to each word, the word embeddings comprising hidden parameters;
determine a word membership function for each word in the first and second sets of words, wherein determining a word membership function for a word comprises determining a set of similarity values, each similarity value representing the semantic similarity between the word and a respective word in the vocabulary;
determine a membership function for the first set of words and a membership function for the second set of words based on the determined word membership functions, wherein determining a membership function for the first and second sets of words comprises, for each of the first and second sets of words, determining a set of similiarity values, each similiarity value representing the semantic similiarity between the respective set of words and a respective word in vocabulary; and
determine a set-based coefficient for the semantic similarity between the first and second sets of words based on the membership function for the first set of words and the membership function for the second set of words.

13. A non-transient computer readable medium comprising instructions that, when executed by a computer, cause the computer to implement the method of claim 1.

14. A computer implemented method for retrieving content in response to receiving a natural language query, the method comprising:
receiving a natural language query submitted by a user using a user interface;
generating an embedded sentence from said query, the embedded sentence comprising hidden parameters;
determining a semantic similarity between the embedded sentence derived from the received natural language query and embedded sentences from queries saved in a database;
determining a set-based coefficient for the similarity between a first and a second set of words based on a membership function for the first set of words and a membership function for the second set of words, wherein determining a membership function for the first and second sets of words comprises, for each of the first and second sets of words, determining a set of similarity values, each similarity value representing the semantic similarity between the respective set of words and a respective word in the vocabulary;
retrieving a response for an embedded sentence determined to be semantically similar to one of the saved queries; and
providing the response to the user via the user interface.

* * * * *

UNITED STATES PATENT AND TRADEMARK OFFICE
CERTIFICATE OF CORRECTION

| | |
|---|---|
| PATENT NO. | : 10,628,529 B2 |
| APPLICATION NO. | : 16/283707 |
| DATED | : April 21, 2020 |
| INVENTOR(S) | : Vitalii Zhelezniak et al. |

It is certified that error appears in the above-identified patent and that said Letters Patent is hereby corrected as shown below:

In the Claims

Column 20, Claim Number 1, Line Numbers 49-50, Should Read:
a set of similarity values, each similarity value representing the semantic similarity between the respective Column 22, Claim Number 12, Line Numbers 24-25, Should Read:
similarity values, each similarity value representing the semantic similarity between the respective set of Signed and Sealed this
Seventh Day of July, 2020

Andrei Iancu
*Director of the United States Patent and Trademark Office*